United States Patent [19]
Shimazaki

[11] Patent Number: 6,038,253
[45] Date of Patent: Mar. 14, 2000

[54] DATA RECEIVER WITH SYMBOL RATE DISCRIMINATION AND STATISTICAL ANALYSIS FUNCTIONS

[75] Inventor: Yoshihito Shimazaki, Tokyo, Japan

[73] Assignee: Oki Electric Industry Co., Ltd., Tokyo, Japan

[21] Appl. No.: 09/052,130

[22] Filed: Mar. 31, 1998

Related U.S. Application Data

[62] Division of application No. 08/712,412, Sep. 11, 1996, Pat. No. 5,883,923.

[30] Foreign Application Priority Data

Sep. 18, 1995 [JP] Japan ..................................... 7-238660
Oct. 20, 1995 [JP] Japan ..................................... 7-272497

[51] Int. Cl.[7] .............................. H04B 17/00; H04B 3/46; H04Q 1/20
[52] U.S. Cl. .......................................................... 375/224
[58] Field of Search ..................................... 375/224, 225, 375/341, 316, 377, 340; 370/252, 241; 714/994, 795, 790, 262

[56] References Cited

U.S. PATENT DOCUMENTS

| | | | |
|---|---|---|---|
| 5,537,410 | 7/1996 | Li .............................................. | 370/465 |
| 5,566,206 | 10/1996 | Butler et al. .............................. | 375/225 |
| 5,627,845 | 5/1997 | Asano et al. . | |
| 5,671,255 | 9/1997 | Wang et al. .............................. | 375/341 |
| 5,689,511 | 11/1997 | Shimazaki et al. ...................... | 370/545 |
| 5,757,850 | 5/1998 | Takaki ...................................... | 375/225 |
| 5,953,636 | 9/1999 | Keate et al. .............................. | 455/3.2 |

Primary Examiner—Chi H. Pham
Assistant Examiner—Jean B. Corrielus
Attorney, Agent, or Firm—Venable; Robert J. Frank

[57] ABSTRACT

A received signal has been converted from a source symbol rate to another symbol rate by symbol repetition, then interleaved to form frames in which the same symbol sequence is repeated multiple times. The source symbol rate is identified by dividing each frame into various numbers of blocks, and determining whether each such division makes at least a certain proportion of the blocks identical. The source symbols are reproduced by identifying a subset of similar blocks from statistical properties of the blocks, and combining the signal values in the subset of blocks.

19 Claims, 7 Drawing Sheets

DATA RECEIVER WITH SYMBOL RATE DISCRIMINATION AND STATISTICAL ANALYSIS FUNCTIONS

CROSS REFERENCE TO RELATED U.S. APPLICATIONS

This is a divisional of application Ser. No. 08/712,412, filed on Sep. 11, 1996, now U.S. Pat. No. 5,883,923.

BACKGROUND OF THE INVENTION

The present invention relates to a data receiver for use in a system in which source data can be produced at different data rates, but the data are interleaved and transmitted at a single, fixed rate.

Examples of such systems can be found among cellular telephone systems employing code-division multiple-access (CDMA) communication. Some of these systems use a variable-rate vocoder which can encode a digitized voice signal at several different output data rates, higher rates leading to higher speech quality when the signal is decoded. The coded signal is transmitted at a rate equivalent to the highest output rate of the vocoder. When channel conditions are unfavorable, the vocoder output rate is reduced, and each output bit or symbol is transmitted multiple times to increase the probability of successful reception.

It therefore becomes necessary for the receiver to identify the data rate of the received signal. A conventional approach is to carry out the usual receiving process at each rate in turn until correct results are obtained, as determined from check information that was inserted into the transmitted data. This approach requires much processing, however. In the worst case, every one of the data rates must be tested before the correct rate is found.

Under unfavorable channel conditions, even after the data rate has been correctly identified, there remains the problem of data corruption in transmission. A conventional practice is to combine all of the received data by summing or averaging, in the expectation that errors will be smoothed out. A problem is that when large errors occur, due to a burst of noise, for example, the contribution of erroneous symbols to the sums or averages may outweigh the contributions of other symbols to such a extent that incorrect data values are obtained.

SUMMARY OF THE INVENTION

It is accordingly an object of the present invention to quickly determine the data rate of an interleaved signal.

Another object of the invention is to remove unreliable data values from an interleaved signal in which each symbol is repeated more than two times.

The invented data receiver receives an interleaved signal having a fixed symbol rate, and comprises at least two of the following elements: a data rate discriminator, a data reproducing apparatus, and a decoding means.

The data rate discriminator stores the symbols constituting the interleaved signal in a buffer, divides the symbol data in the buffer into N equal blocks, where N is an integer greater than one, and decides whether more than a certain proportion of the N blocks have identical data. If more than a certain proportion of the N blocks have identical data, the data rate discriminator identifies the source data rate as being equal to the fixed symbol rate divided by N.

The data reproducing apparatus analyzes statistical properties of the N blocks, selects a subset of mutually similar blocks on the basis of these statistical properties, combines the blocks in the selected subset by adding the signal values at corresponding symbol positions, and outputs the resulting sums. The data reproducing apparatus also deinterleaves the signal, so that the sums are output in the correct order.

The decoding means decodes the sums output by the data reproducing apparatus.

DETAILED DESCRIPTION OF THE INVENTION

An embodiment of the invention will be described with reference to the attached illustrative drawings. This embodiment processes vocoded data that have been convolutionally coded, interleaved, then transmitted over a wireless link in, for example, a cellular telephone system. The data symbols in this embodiment are binary bits, so the terms 'bit' and 'symbol' will be used synonymously.

Figure 1:
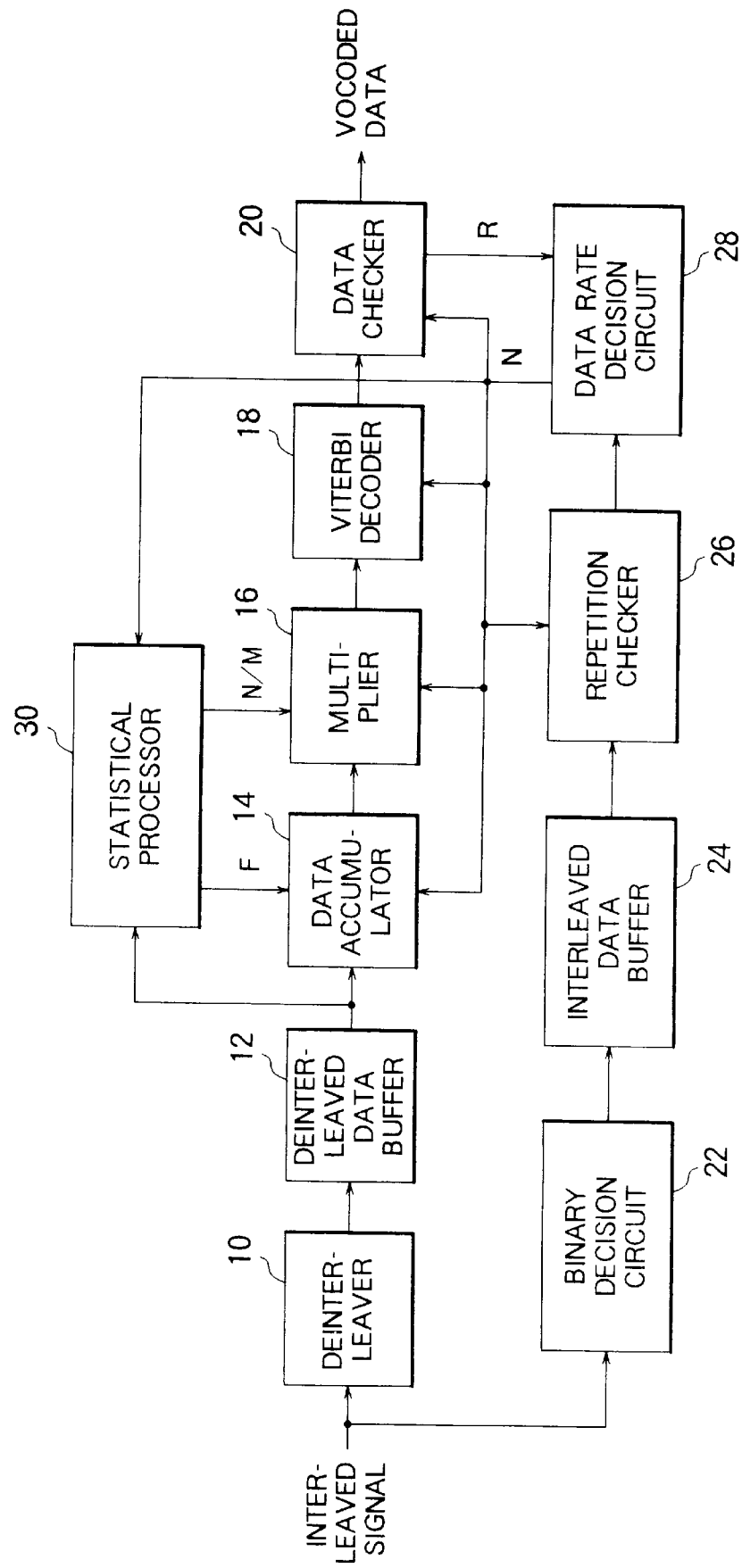
FIG. 1 is a block diagram of the invented data receiver.

Referring to FIG. 1, the invented data receiver comprises a deinterleaver 10, a deinterleaved data buffer 12, a data accumulator 14, a multiplier 16, a Viterbi decoder 18, a data checker 20, a binary decision circuit 22, an interleaved data buffer 24, a repetition checker 26, a data rate decision circuit 28, and a statistical processor 30. All of these elements can be realized as microelectronic integrated circuits, or parts of such integrated circuits. The deinterleaved data buffer 12 and interleaved data buffer 24 are memory circuits; the other elements are processing circuits.

In this data receiver, the data rate discriminator comprises the binary decision circuit 22, interleaved data buffer 24, repetition checker 26, and data rate decision circuit 28. The data reproducing apparatus comprises the deinterleaver 10, deinterleaved data buffer 12, data accumulator 14, multiplier 16, and statistical processor 30. The decoding means comprises the Viterbi decoder 18 and data checker 20. There is some overlap, however, in that the data reproducing apparatus and decoding means are also employed in data rate discrimination.

The deinterleaver 10 receives an interleaved signal, and deinterleaves the signal by writing signal values at appropriate addresses in the deinterleaved data buffer 12. The deinterleaved data buffer 12 stores the signal values while they are being processed by the data accumulator 14 and statistical processor 30.

The data accumulator 14 adds signal values stored in the deinterleaved data buffer 12 according to a flag vector F of length N, where N is a data rate conversion factor, and outputs the resulting sums to the multiplier 16. The data rate conversion factor N is a positive integer. The multiplier 16 multiplies the above sums by a factor of N/M, where M is another positive integer, not exceeding N, and supplies the resulting products to the Viterbi decoder 18.

The Viterbi decoder 18 performs a convolutional decoding process, using the well-known Viterbi algorithm, and outputs convolutionally decoded data to the data checker 20. The data checker 20 checks the convolutionally decoded data for errors, outputs the result R of this error check to the data rate decision circuit 28, and outputs the convolutionally decoded data themselves as vocoded data. The multiplier 16, Viterbi decoder 18, and data checker 20 operate at a data rate determined by the conversion factor N. The vocoded data undergo further decoding by circuits not shown in the drawing to reconstruct an analog voice signal.

The binary decision circuit 22 receives the same interleaved signal as the deinterleaver 10, makes a hard decision as to the value (zero or one) of each symbol in the interleaved signal, and writes the results as binary data in the interleaved data buffer 24. The interleaved data buffer 24 stores the binary data while they are being processed by the repetition checker 26.

The repetition checker 26 divides the data stored in the interleaved data buffer 24 into blocks according to the conversion factor N, compares the blocks, and reports whether or not more than half of the blocks are mutually identical.

The data rate decision circuit 28 infers the data rate of the interleaved signal from the results obtained by the repetition checker 26 and data checker 20, and furnishes the corresponding value of the data rate conversion factor N to the data accumulator 14, multiplier 16, Viterbi decoder 18, data checker 20, and statistical processor 30. When N is greater than two, the statistical processor 30 calculates N variance values from the data stored in the deinterleaved data buffer 12, selects a subset of interleaved blocks on the basis of these variance values, and computes the factor N/M, where M is the number of blocks in the subset. The statistical processor 30 also sets the flag vector F so as to identify the selected blocks.

Before the operation of the invented data receiver is described, it will be useful to explain how the data are coded and interleaved in the data transmitter.

Figure 2:
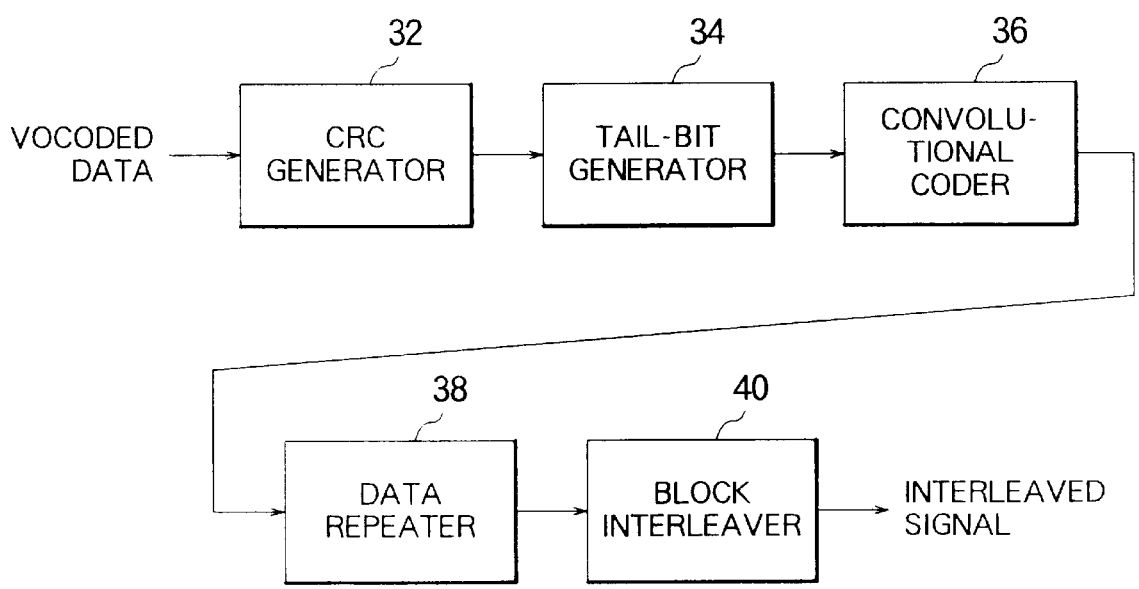
FIG. 2 is a block diagram of part of a data transmitter.

FIG. 2 is a block diagram of the relevant parts of the data transmitter, including a cyclic redundancy check (CRC) generator 32, a tail-bit generator 34, a convolutional coder 36, a data repeater 38, and a block interleaver 40. The data transmitter is located at, for example, a base station in a cellular telephone system. Not shown in FIG. 2 is the variable-rate vocoder that receives an analog voice signal from, for example, a public telephone network, and converts the analog signal to digital vocoded data. The vocoded data are grouped into frames, which are generated at a rate of fifty frames per second.

As noted above, the vocoder operates at different rates, depending on the quality of the channel over which the data will be transmitted. Thus although the frame rate is fixed, the number of bits per frame is not. In the following description the vocoder has four output bit rates: 0.8 kbps (16 bits/frame); 2.0 kbps (40 bits/frame); 4.0 kbps (80 bits/frame); and 8.6 kbps (172 bits/frame), where kbps denotes kilobits per second.

If the vocoded data rate is 8.6 kbps, the CRC generator 32 calculates and adds twelve cyclic redundancy check bits to each frame, to permit the checking of errors in the frame data. If the vocoded data rate is 4.0 kbps, the CRC generator 32 adds eight cyclic redundancy check bits per frame. If the vocoded data rate is 2.0 kbps or 0.8 kbps, the CRC generator 32 does not calculate or add cyclic redundancy check bits, but simply passes the data on to the tail-bit generator 34.

The tail-bit generator 34 adds eight tail bits to each frame. The data output by the tail-bit generator 34 accordingly have one of the following data rates: 1.2 kbps (24 bits/frame), 2.4 kbps (48 bits/frame), 4.8 kbps (96 bits/frame), or 9.6 kbps (192 bits/frame).

The convolutional coder 36 codes the data output by the tail-bit generator 34, using a convolutional code having a code rate of one-half. That is, the convolutional coder 36 outputs two bits for every one input bit. The convolutionally coded data thus have one of the following four bit rates: 2.4 kbps (48 bits/frame), 4.8 kbps (96 bits/frame), 9.6 kbps (192 bits/frame), or 19.2 kbps (384 bits/frame).

The data repeater 38 and block interleaver 40 combine to interleave the convolutionally coded data at a fixed rate of 19.2 kbps (384 bits/frame), equal to the highest output rate of the convolutional coder 36. If the convolutionally coded data have a lower rate, the data repeater 38 first converts this rate to 19.2 kbps by repeating each bit the necessary number of times. The block interleaver 40 then interleaves the converted data. The data are interleaved a frame at a time, using the same interleaving scheme for each frame, regardless of the vocoded data rate.

Figure 3:
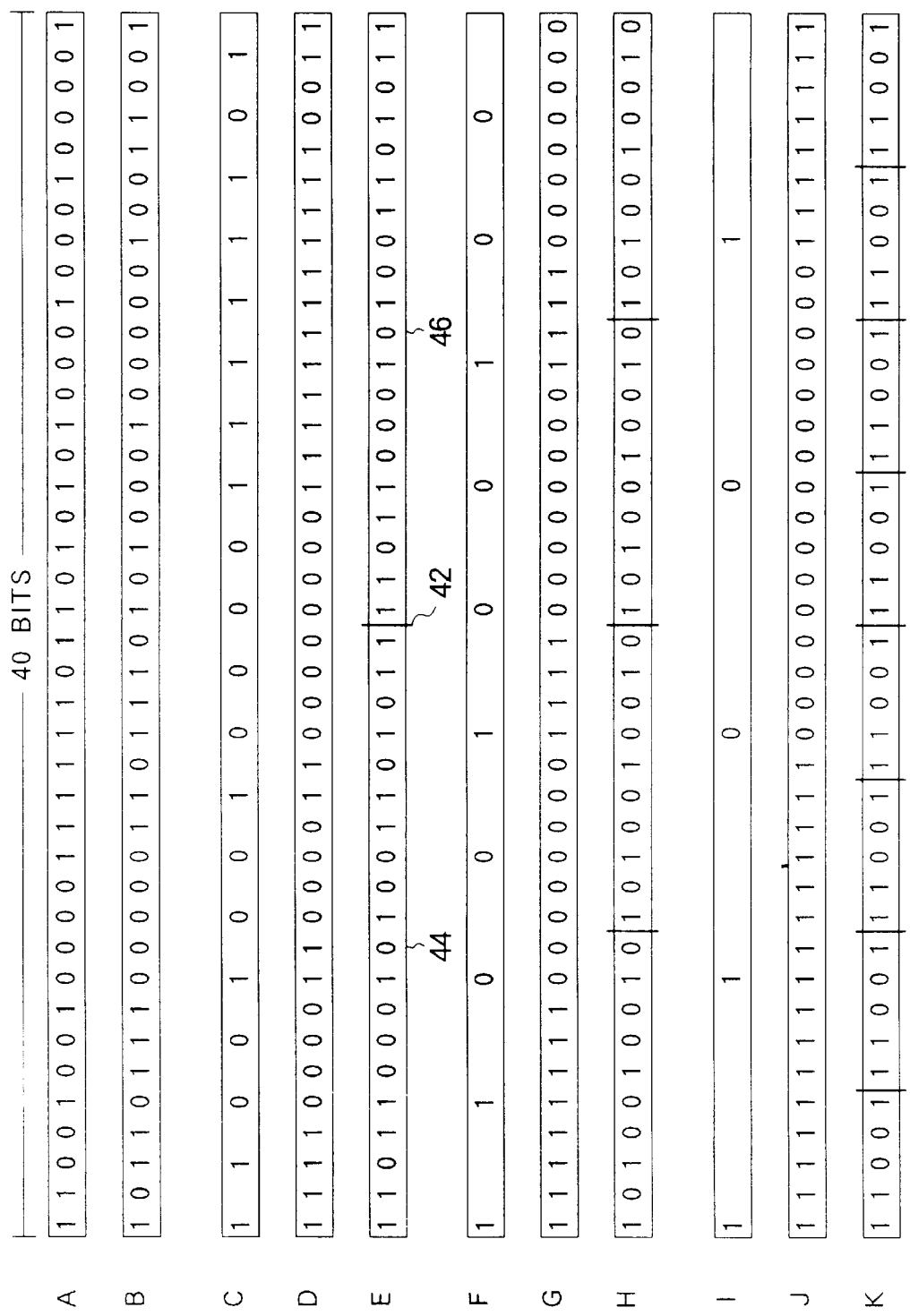
FIG. 3 illustrates data rate conversion and interleaving.

FIG. 3 illustrates the interleaving process. To simplify the drawing, the final output frame length is shown as forty bits instead of three hundred eighty-four bits. The frame length of the data input to the data repeater 38 is thus five, ten, twenty, or forty bits, depending on whether the data rate is 2.4 kbps, 4.8 kbps, 9.6 kbps, or 19.2 kbps.

The position of each data bit in the forty-bit frame before interleaving can be given by a six-bit binary address $a_5a_4a_3a_2a_1a_0$, where $a_5$ is the most significant address bit and $a_0$ is the least significant address bit. The address range is from zero ('00000') to thirty-nine ('100111'). Interleaving moves the data bit from address $a_5a_4a_3a_2a_1a_0$ to the address given by the following formula.

$$(20 \times a_0) + (10 \times a_1) + (5 \times a_2) + a_3 + (2 \times a_4) + (4 \times a_5)$$

Thus the bit at address zero ('000000') remains fixed, the bit at address one ('000001') moves to bit address twenty ('010100'), and so on.

Row A in FIG. 3 shows a forty-bit frame input at a rate of 19.2 kbps to the data repeater 38. The data repeater 38 passes this frame unchanged to the block interleaver 40, which interleaves the bits by the formula above, resulting in row B.

Row C shows a twenty-bit frame input at a rate of 9.6 kbps to the data repeater 38. The data repeater 38 converts the data rate to 19.2 kbps by repeating each bit, as shown in row D. Application of the above interleaving formula by the block interleaver 40 results in the frame in row E. The interleaved frame in row E can be seen to consist of two repetitions of the same twenty-bit data sequence, these two repetitions being separated by a vertical line 42 in the drawing. Each of these two repetitions will be referred to below as an interleaved block. The frame in row E thus comprises two interleaved blocks 44 and 46.

Row F shows a ten-bit frame input at a rate of 4.8 kbps to the data repeater 38. The data repeater 38 converts the data rate to 19.2 kbps by repeating each bit four times, as shown in row G. Application of the above interleaving formula results in the frame in row H, which can be seen to consist of four repetitions of the same ten-bit data sequence, forming four interleaved blocks.

Row I shows a five-bit frame input at a rate of 2.4 kbps to the data repeater 38. The data repeater 38 converts the data rate to 19.2 kbps by repeating each bit eight times as shown in row J. Application of the above interleaving formula gives the frame in row K, which consists of eight repetitions of the same five-bit data sequence, forming eight interleaved blocks.

The interleaving formula for three-hundred-eight-four-bit frames differs from the above, but has a similar effect. When the data repeater 38 converts the data rate by a factor of N (where N equals two, four, or eight), the interleaved frame consists of N repetitions of the same data sequence, forming N interleaved blocks.

The data stream output by the block interleaver 40 becomes the transmitted signal as follows. The interleaved data are first spread by multiplication by a spreading code having a bit rate or "chip rate" of, for example, 1.288 megachips per second (Mcps). The resulting chip data are used to modulate a carrier signal by a digital modulation scheme such as a phase-shift keying (PSK) scheme. The modulated carrier signal is amplified and transmitted from an antenna to, for example, a portable telephone set, or to another type of mobile station in a cellular telephone system. The signal received by the mobile station is demodulated and despread to recover the interleaved data stream.

The invented data receiver shown in FIG. 1 receives the interleaved signal at a stage where the signal has been despread, but no hard decision has yet been made as to the binary value of each bit. Instead, each bit is represented by a positive or negative value that may vary over a substantially continuous range.

Figure 4:
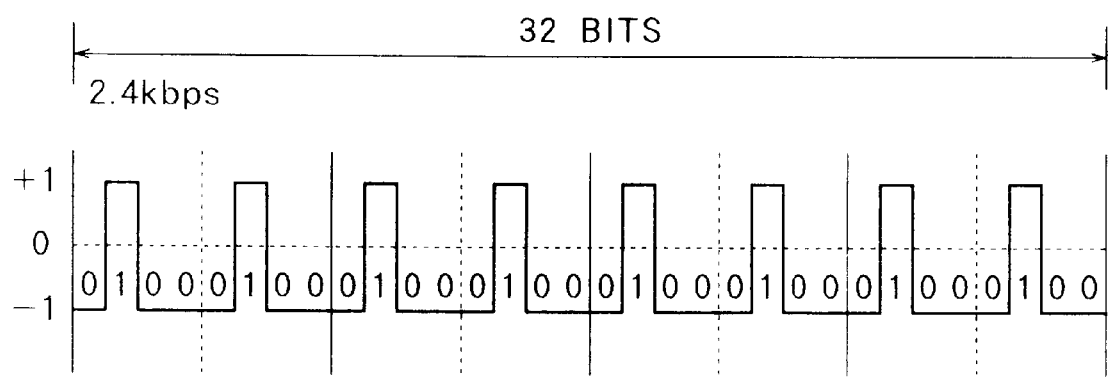
FIG. 4 illustrates a frame of transmitted data.

FIG. 4 illustrates a hypothetical frame of interleaved data that have been converted from 2.4 kbps to 19.2 kbps in preparation for transmission. To further simplify the drawing, the converted frame is now regarded as consisting of only thirty-two bits. The frame shown consists of eight interleaved blocks, each containing the data '0100.' The binary value '1' is represented by a signal level of plus one, and the binary value '0' by a signal level of minus one.

Figure 5:
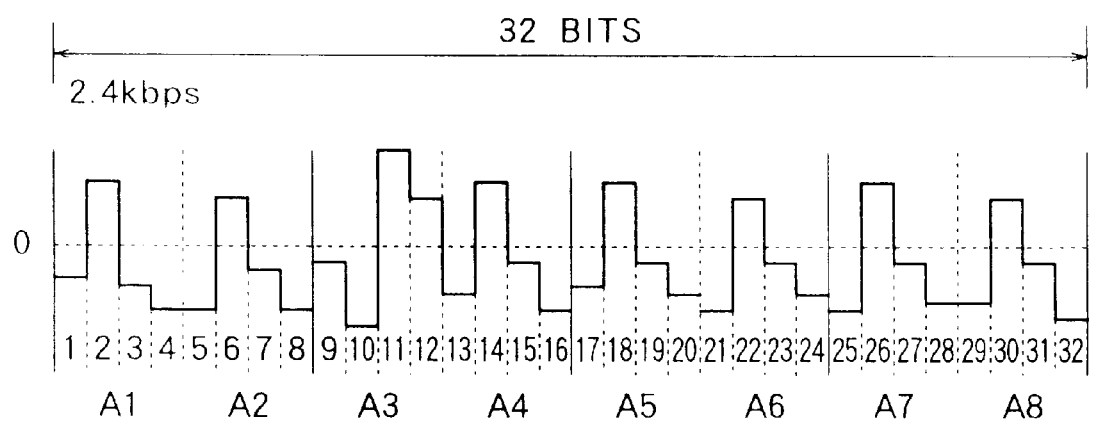
FIG. 5 illustrates the data in FIG. 4 as received at the data receiver.

FIG. 5 shows the corresponding received frame after demodulation and despreading. Due to interference, fading, and other disrupting factors, the received signal values differ by various amounts from plus and minus one. A short burst error has occurred at bits ten, eleven, and twelve, causing large deviations of the signal values at these bits. The received frame thus consists of eight interleaved blocks A1, A2, . . . , A8 that are only nominally identical. The term 'nominally identical' as used herein means that the received blocks would be identical in the absence of disrupting factors such as interference, but the actual received signal values vary somewhat from block to block.

The operation of the invented data receiver will now be described.

The data receiver must begin by determining the data rate. That is, the data receiver must determine the value of the conversion factor N. The four possible values of N (eight, four, two, and one) are tested in turn, as follows.

Referring again to FIG. 1, the binary decision circuit 22 assigns a value of '0' or '1' to each received bit. In FIG. 5, '0' is assigned to bits with received signal levels of zero or less, and '1' to bits with received signal levels values greater than zero. As a result, the following thirty-two-bit frame is stored in the interleaved data buffer 24:

01000100001101000100010001000100

Assuming provisionally than N is equal to eight, the data rate decision circuit 28 instructs the repetition checker 26 to divide this frame into eight equal blocks, compare the blocks, and report whether more than half of the blocks are mutually identical. The repetition checker 26 divides the data as follows:

0100 0100 0011 0100 0100 0100 0100 0100

Seven of these eight blocks are identically '0100,' so the repetition checker 26 reports that more than half of the blocks are mutually identical. The data rate decision circuit 28 therefore decides that N is indeed equal to eight, and that the data rate is 2.4 kbps.

Figure 6:
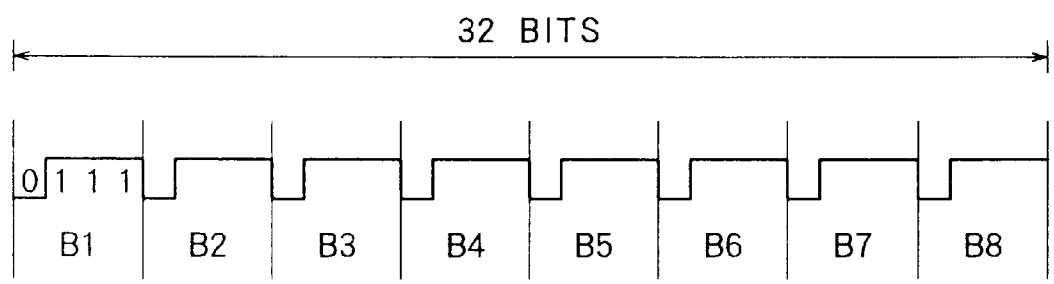
FIG. 6 illustrates another frame of transmitted data.
Figure 7:
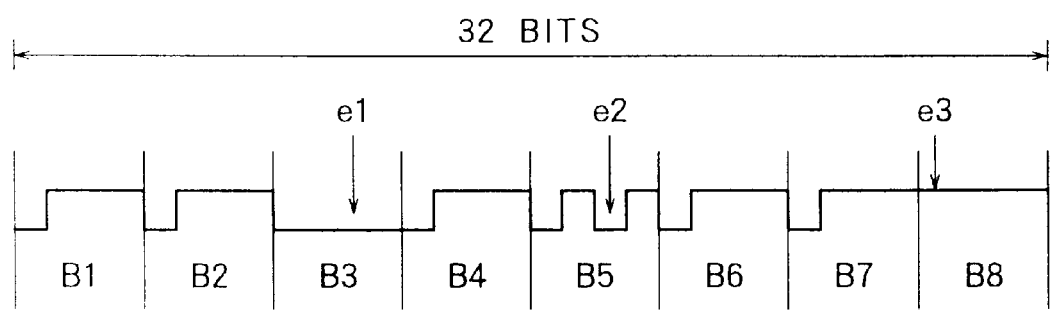
FIG. 7 illustrates the data in FIG. 6 as stored in the interleaved data buffer in the data receiver.

FIGS. 6 and 7 show another example of the detection of a 2.4-kbps data rate. FIG. 6 shows the transmitted frame, after interleaving in the transmitter, consisting of eight identical interleaved blocks from B1 to B8. FIG. 7 shows the received data sequence stored in the interleaved data buffer 24. Because of a burst error at e1 and bit errors at e2 and e3, blocks B3, B5, and B8 have incorrect data, but the other five blocks are mutually identical, so once again, the data rate is correctly identified as 2.4 kbps.

If it is not true that more than half of the eight blocks are mutually identical, the data rate decision circuit 28 next instructs the repetition checker 26 to divide the data in the interleaved data buffer 24 into four equal blocks and report whether more than half of these four blocks are mutually identical. If an affirmative report is obtained, the data rate decision circuit 28 concludes that N is equal to four, i.e. that the data rate is 4.8 kbps.

Figure 8:
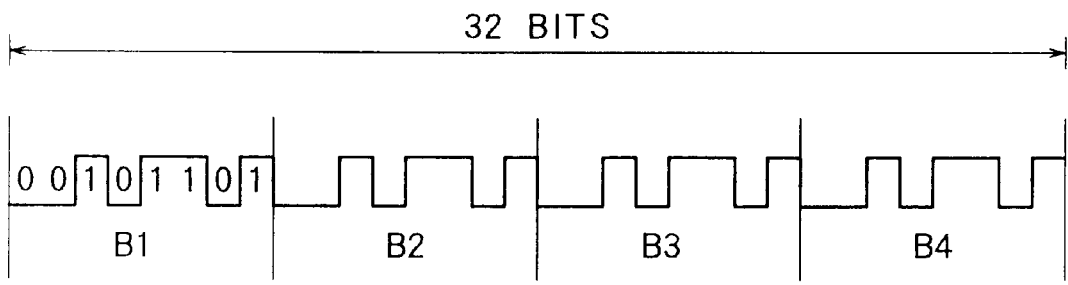
FIG. 8 illustrates still another frame of transmitted data.
Figure 9:
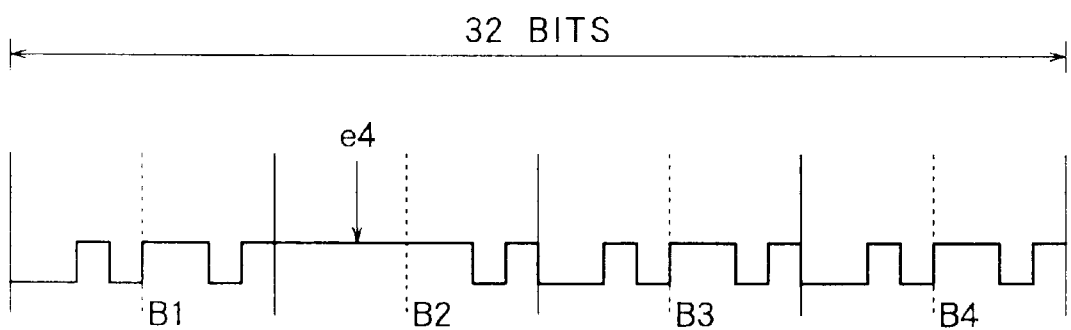
FIG. 9 illustrates the data in FIG. 8 as stored in the interleaved data buffer in the data receiver.

FIGS. 8 and 9 show an example of the detection of a 4.8-kbps data rate. FIG. 8 shows the transmitted data, consisting of four identical interleaved blocks B1 to B4. FIG. 9 shows the received data stored in the interleaved data buffer 24. Because of a burst error at e4, block B2 is incorrect. When these data are divided into eight blocks, no five of the eight blocks are mutually identical, but when the data are divided into four blocks, blocks B1, B3, and B4 are mutually identical. The data rate is thus correctly identified as 4.8 kbps.

Figure 10:
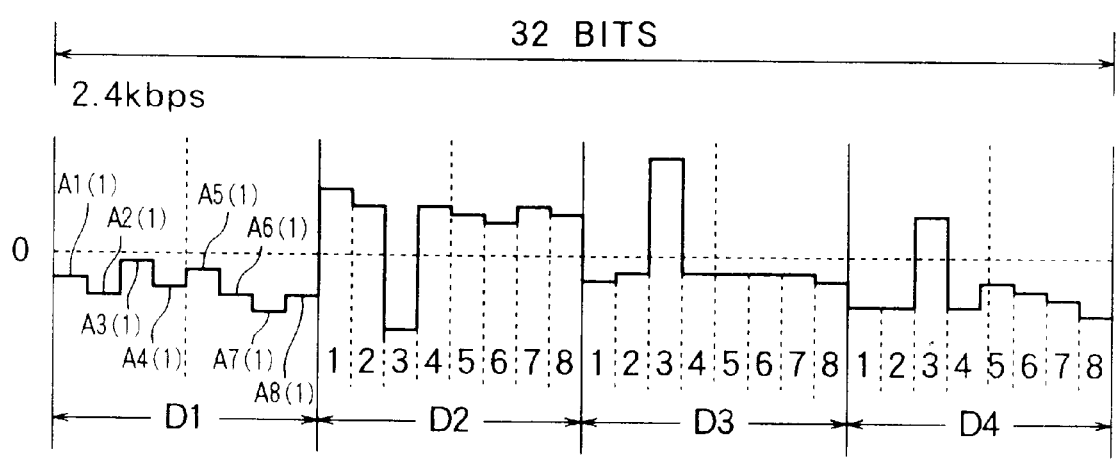
FIG. 10 illustrates the received data in FIG. 5 after deinterleaving.

Referring again to FIG. 1, in addition to being processed as described above to test for mutually identical blocks, the same received data are also deinterleaved by the deinterleaver 10 and stored in the deinterleaved data buffer 12. The process carried out by the deinterleaver 10 is the reverse of the interleaving process carried out by the block interleaver 40 in FIG. 2. For example, FIG. 10 shows the deinterleaved data stored in the deinterleaved data buffer 12 when the frame in FIG. 5 is received. The signal values are stored as-received in the deinterleaved data buffer 12, with no hard decision made yet as to the binary value of each bit.

If at least five of the eight blocks tested under the assumption that N=8 are identical, the data rate decision circuit 28 supplies the value N=8 to the data accumulator 14, multiplier 16, Viterbi decoder 18, data checker 20, and statistical processor 30, and instructs them to accumulate, decode, and check the data at a rate of 2.4 kbps, as will be described later.

If no five of the eight blocks are mutually identical, but three of the four blocks tested under the assumption that N=4 are mutually identical, the data rate decision circuit 28 supplies the value N=4 to the data accumulator 14, multiplier 16, Viterbi decoder 18, data checker 20, and statistical processor 30, which proceed to process the data at a rate of 4.8 kbps.

If no three of these four blocks are mutually identical, the data rate decision circuit 28 supplies the value N=2 to the data accumulator 14, multiplier 16, Viterbi decoder 18, and data checker 20, and instructs them to undertake trial decoding of the data in the deinterleaved data buffer 12 at a rate of 9.6 kbps. The data accumulator 14 provides the multiplier 16 with the sums of successive pairs of signal values, thereby reducing the data rate from 19.2 kbps to 9.6 kbps. The multiplier 16 passes these sums to the Viterbi decoder 18, which decodes them. The decoding process comprises a hard decision process, and produces binary decoded data. The data checker 20 checks the CRC bits in the decoded data, and notifies the data rate decision circuit 28 whether these bits have the correct values. The tail bits may also be checked. If these checks pass, the data rate is assumed to be 9.6 kbps, and the data accumulator 14, multiplier 16, Viterbi decoder 18, and data checker 20 continue to process subsequent frames at this rate.

If the data checker 20 reports incorrect data, the data rate decision circuit 28 supplies the value N=1 to the data accumulator 14, multiplier 16, Viterbi decoder 18, and data checker 20, and instructs them to undertake trial decoding of the data in the deinterleaved data buffer 12 at a rate of 19.2 kbps. The data in the deinterleaved data buffer 12 are now passed to the Viterbi decoder 18 without alteration. If the decoded data check out correctly, the data rate is assumed to be 19.2 kbps, and subsequent frames are processed at this rate. If correct data are still not obtained, the data rate cannot be determined from the current frame, so the next frame is tested by block comparison and, if necessary, trial decoding as described above. This testing process continues until the data rate decision circuit 28 obtains an affirmative result from either the repetition checker 26 or the data checker 20.

The Viterbi decoding process requires much computation, so it is a significant advantage of the invented data receiver that two of the four data rates, namely the two slower rates of 2.4 kbps (N=8) and 4.8 kbps (N=4), are tested by the simpler block comparison procedure, without actually decoding the data.

Once the data rate has been identified, processing of further received data continues at the identified rate. The processing carried out by the deinterleaver 10, Viterbi decoder 18, and data checker 20 is well known in the art, so the following description will concentrate on the novel processing carried out by the statistical processor 30, and the associated processes carried out by the data accumulator 14 and multiplier 16. In the description, N will denote the data rate conversion factor as above, and L will denote the number of bits per interleaved frame. In FIG. 10, L is thirty-two and N is eight. In a cellular telephone system employing the coding scheme described earlier, L is three hundred eighty-four.

As explained above, the data in FIG. 10 were obtained by deinterleaving of the received frame in FIG. 5, which comprises eight nominally identical interleaved blocks A1, A2, . . . , A8. The data in FIG. 10 can be grouped into four deinterleaved blocks D1, D2, D3, and D4. In the general case, there are N nominally identical interleaved blocks An (n=1, 2, . . . , N), and L/N deinterleaved blocks Dk (k=1, 2, . . . , L/N).

When N is greater than two, for each of the N interleaved blocks An, the statistical processor 30 computes two statistical properties: the mean and the variance. Since the computation is carried out using the deinterleaved data in the deinterleaved data buffer 12, the computational procedure is as follows.

Each deinterleaved block Dk comprises N data values, which can be denoted A1(k), A2(k), A3(k) . . . , as indicated in FIG. 10 for k=1. The maximum value of the parameter k is L/N. The values An(1), An(2), An(3), . . . come from the n-th interleaved block An (n=1, 2, . . . , N). The mean Un and variance Vn of the data in the n-th interleaved block An are defined as follows.

$$Un = (N/L) \times \sum_{k=1}^{L/N} An(k)$$

$$Vn = (N/L) \times \sum_{k=1}^{L/N} [An(k) - Un]^2$$

The calculations can be carried out using these formulas directly, or using other well-known methods.

Next, the average value W of the variances is calculated. This average variance W is defined as follows.

$$W = (1/N) \times \sum_{n=1}^{N} Vn$$

The absolute difference |Vn−W| between the variance Vn of each interleaved block and the average variance W is then compared with a threshold value T. If the absolute difference equals or exceeds T, the data from the n-th interleaved block are discarded. In this way, a subset S of interleaved blocks is selected. The selected blocks An satisfy the following condition.

$$|Vn-W|<T$$

The number M of interleaved blocks in the subset S may be equal to or less than N. If all blocks satisfy the above condition, then the subset S is equal to the full set of interleaved blocks, and M is equal to N. (In mathematical terminology, S is an improper subset.) If some blocks do not satisfy the above condition, then M is less than N (and S is a proper subset).

If no blocks satisfy the above condition, the block An with the minimum value of |Vn−W| is selected and M is set equal to one. The subset S must always contain at least one block.

The flag vector F supplied by the statistical processor 30 to the data accumulator 14 is an N-bit vector F(1), . . . , F(N). The n-th bit F(n) is set to one if block An is in the selected subset S, and to zero if An is not in the selected subset S.

For each deinterleaved block Dk, the data accumulator 14 adds up the data values that came from the interleaved blocks An in the selected subset S. That is, the data accumulator 14 computes the following sum Ek:

$$Ek = \sum_{n=1}^{N} An(k)F(n)$$

In the example in FIGS. 5 and 10, the data in interleaved blocks A1, A2, A4, . . . , A8 are dispersed by similar amounts, so these block have substantially equal variances, but interleaved block A3 has greater data dispersion, hence a higher variance. It will be assumed that |V3−W| exceeds the threshold T, and the other values |Vn−W| (n≠3) are less than T. Thus in each deinterleaved block Dk, the data accumulator 14 discards the third bit A3 (k) and takes the sum of the other seven bits.

The statistical processor 30 also calculates the value of N/M, and the multiplier 16 multiplies each of the sums Ek computed by the data accumulator 14 by N/M (e.g. by 8/7 in the case of FIG. 10), to compensate for the absence of the discarded data. This operation normalizes the data values.

The Viterbi decoder 18 performs a convolutional decoding process on the normalized data values output by the multiplier 16, and the data checker 20 performs an error check on the decoded data. As noted above, the Viterbi decoder 18 makes a hard decision as to the value of each bit. By excluding doubtful signal values from the sums Ek, hence from the data provided to the Viterbi decoder 18, the invented data receiver raises the probability that the Viterbi decoder 18 will be able to decode all bits to the correct values.

In FIG. 10, for example, if all data values were to be included in the sums, the sum in the third block would be almost exactly equal to the center signal level of zero, so it would be difficult to decide whether the third deinterleaved block D3 represented a binary "0" or a binary "1." By excluding the third data value from block D3, the accumulator 14 produces an unmistakably negative signal level, correctly representing a binary "0."

Removing doubtful values from the received signal in this way can markedly improve the performance of the data receiver when burst errors occur. As a result, communication can take place at 4.8 kbps under channel conditions that would require the 2.4-kbps rate with a conventional data receiver, and a very noticeable improvement in decoded voice quality can be obtained. When severe channel conditions require the 2.4-kbps rate, voice quality is also improved, as compared with a conventional data receiver, because of the more accurate decoding.

When the data rate is 9.6 kbps (N=2), there are only two blocks, so it is not possible to select a proper subset of blocks with mutually similar statistical properties. Accordingly, the statistical processor 30 does not operate when N is equal to two; the accumulator 14 includes all of the data in the calculated sums.

When the data rate is 19.2 kbps (N=1), the Viterbi decoder 18 decodes the deinterleaved data directly from the deinterleaved data buffer 12. Neither the accumulator 14 nor the statistical processor 30 performs any operations.

The operation of the above embodiment can be varied in several ways, regarding both data rate discrimination and the selection of interleaved blocks for accumulation.

As one variation, the data accumulator 14, multiplier 16, Viterbi decoder 18, and data checker 20 can begin processing the data in the deinterleaved data buffer 12 at an assumed rate of 9.6 kbps (N=2) while the repetition checker 26 is comparing blocks of data in the interleaved data buffer 24 to test the rates of 4.8 kbps and 2.4 kbps (N=4 and N=8). If a rate of 4.8 kbps or 2.4 kbps is detected, the data rate decision circuit 28 instructs the data accumulator 14, multiplier 16, Viterbi decoder 18, data checker 20, and statistical processor 30 to start over and process the data in the deinterleaved data buffer 12 at the detected rate of 4.8 kbps or 2.4 kbps. If neither the 4.8 kbps nor the 2.4 kbps rate is detected, processing of the data in the deinterleaved data buffer 12 at the 9.6 kbps rate continues, in order to test the 9.6-kbps data rate by trial decoding. In this way, the testing of different data rates can be carried out, at least partially, in parallel.

As another variation, it is possible to detect the 9.6 kbps data rate (N=2) without trial decoding, by dividing the data in the interleaved data buffer 24 into two blocks and checking whether the two blocks are identical. This method makes no allowance for bit errors, but if parallel processing is possible, the repetition checker 26 can quickly test all three of the slower rates (9.6 kbps, 4.8 kbps, and 2.4 kbps) while the data in the deinterleaved data buffer 12 are being provisionally processed at the 19.2-kbps rate. If any one of the three slower rates is detected through block comparison by the repetition checker 26, processing at the 19.2 kbps rate is discontinued, and the data in the deinterleaved data buffer 12 are processed at the detected slower rate. If none of the slower rates are detected by block comparison, processing at the 19.2-kbps rate continues. If the error check fails, then the data in the deinterleaved data buffer 12 can be processed again at the 9.6-kbps rate.

As another variation, the 4.8-kbps rate can be tested by trial decoding, leaving only the 2.4-kbps rate to be tested by comparison of blocks.

If the data rate is always converted prior to transmission, so that the transmitted data always comprise at least two repetitions of the same data sequence, then all of the data rates can be tested by the block comparison method, and time-consuming trial decoding does not have to be used at all.

In testing data rates by the block comparison method, the repetition checker 26 must report whether more than a certain proportion of the blocks are mutually identical, but this proportion need not be one-half. For example, the repetition checker 26 could report whether more than seven-tenths of the blocks are mutually identical: specifically, whether at least six out of eight blocks are mutually identical when testing the 2.4 kbps data rate, and whether at least three out of four blocks are mutually identical when testing the 4.8 kbps data rate.

If the necessary proportion of mutually identical blocks is one-half or less, ambiguities may occur, such as one data sequence appearing in half of the blocks and another data sequence appearing in the other half. If additional steps are taken to resolve these ambiguities, however, then the repetition checker 26 may test for any proportion high enough to include at least two blocks.

Instead of detecting the data rate on the basis of just one frame, the repetition checker 26 can be adapted to compare data sequences extending across a plurality of frames. Alternatively, the repetition checker 26 can be adapted to make single-frame comparisons, but to average the results of these comparisons (the number of mutually identical blocks) over a plurality of frames, and report whether this average exceeds a certain proportion.

No restriction is placed on the interleaving method, provided that for each data rate conversion factor N, the interleaved data comprise a data sequence repeated N times. It is desirable for the same interleaving method to be used for all values of N, but even this is not a restriction. The interleaved data could simply comprise N repetitions of the source data, for example. In that case, the data rate decision circuit 28 must inform the deinterleaver 10 of the value of N.

The statistical processor 30 described above analyzed the variance of the received data, but other statistical properties can be used instead. The standard deviation can be used, for example. Moreover, instead of computing the average statistical value and comparing the difference from the average with a threshold, the statistical processor can compare the difference from the median with a threshold, or select one of the blocks as most typical, on the basis of the statistical property, and compare the differences from this block with a threshold.

Statistical properties that do not measure dispersion can also be employed. An example of a parameter that does not measure dispersion is the correlation between different blocks. To find a subset of similar interleaved blocks, the statistical processor 30 can calculate a correlation coefficient for each pair of blocks, and select a subset of blocks such that the correlation coefficient of every pair of blocks in the subset exceeds a certain value.

The number of interleaved blocks that are discarded can be limited. The statistical processor 30 can be required to select a subset comprising at least half of the interleaved blocks, for example, or a subset comprising more than half of the interleaved blocks.

The multiplier 16 need not multiply the sum obtained from the data accumulator 14 by N/M. Any factor inversely proportional to M, such as 1/M for example, can be used. If 1/M is used, the decision thresholds employed in the Viterbi decoder 18 should be multiplied by a factor of N.

The multiplier 16 can even be omitted. The sums output by the data accumulator 14 can be supplied directly to the Viterbi decoder 18, together with the value of M, and the Viterbi decoder 18 can adjust the decoding threshold values by appropriate amounts.

The data in the preceding embodiment have been binary data, but the invention can also be practiced with received data comprising m-ary symbols, where m is an integer greater than two.

The invented data processor has been described as comprising a variety of special-purpose processing circuits, but the invention can also be practiced by programming a general-purpose processor such as a microprocessor or digital signal processor to execute equivalent functions.

The invention is not limited to receiving vocoded data in a cellular telephone system. Nor is it necessary for the data to have been convolutionally coded, or to include cyclic redundancy check bits, or to be transmitted by a CDMA communication system. The invention is applicable in any system in which the data are converted from a lower to a higher symbol rate by symbol repetition, then interleaved to form frames comprising repeated data sequences.

Those skilled in the art will recognize that further variations are possible within the scope claimed below.

What is claimed is:

1. A method of reproducing data having a first symbol rate, that have been interleaved at a second symbol rate higher than said first symbol rate to form frames, each frame divisible into a plurality of nominally identical interleaved blocks, comprising the steps of:

computing a statistical property of the interleaved blocks in one of said frames;

selecting from among said interleaved blocks a subset of interleaved blocks indicated to be similar by said statistical property; and combining said subset of interleaved blocks by adding symbol values at like symbol positions in respective interleaved blocks to obtain combined symbol values.

2. The method of claim 1, comprising the further step of:

multiplying said combined symbol values by a factor inversely proportional to a number of interleaved blocks in said subset.

3. The method of claim 1, wherein said statistical property measures dispersion of symbol values in said interleaved blocks.

4. The method of claim 3, wherein said statistical property is a variance property.

5. The method of claim 1, wherein said step of selecting comprises the further steps of:

calculating an average value of said statistical property for said interleaved blocks; and selecting interleaved blocks in which said statistical property differs from said average value by less than a certain amount.

6. A data reproducing apparatus for receiving a signal created from data having a first symbol rate, by interleaving said data at a second symbol rate higher than said first symbol rate to form frames divisible into identical interleaved blocks, comprising:

a statistical processor for computing statistical properties of the interleaved blocks in one of said frames and selecting, from said statistical properties, a subset of mutually similar interleaved blocks, said subset comprising a variable number of interleaved blocks; and a data accumulator for combining the interleaved blocks in said subset by adding corresponding data values in different interleaved blocks in said subset, and outputting resulting sums.

7. The data reproducing apparatus of claim 6, wherein said statistical processor finds an average value of the statistical properties computed for said interleaved blocks, and selects, as said subset of mutually similar interleaved blocks, interleaved blocks with statistical properties not differing from said average value by more than a predetermined amount.

8. The data reproducing apparatus of claim 6, wherein said statistical properties comprise a data dispersion property.

9. The data reproducing apparatus of claim 8, wherein said data dispersion property is a variance.

10. The data reproducing apparatus of claim 6, also comprising:

a multiplier for multiplying the sums output by said data accumulator by a factor inversely proportional to the number of interleaved blocks in said subset.

11. The data reproducing apparatus of claim 10, wherein said statistical properties comprise a dispersion property.

12. The data reproducing apparatus of claim 11, wherein said dispersion property is a variance.

13. A data receiver for receiving a signal created from convolutionally coded data having a first symbol rate, by interleaving said data at a second symbol rate higher than said first symbol rate to form frames, each frame being divisible into a plurality of nominally identical interleaved blocks, comprising:

a deinterleaver for deinterleaving said signal;

a statistical processor for computing statistical properties of said interleaved blocks in one of said frames and selecting, from said statistical properties, a subset of mutually similar interleaved blocks, said subset comprising a variable number of said interleaved blocks;

a data accumulator coupled to said deinterleaver and said statistical processor, for combining the interleaved blocks in said subset by adding corresponding data values in different interleaved blocks in said subset, and outputting resulting sums in a deinterleaved order; and a Viterbi decoder coupled to said data accumulator, for convolutionally decoding the sums output by said data accumulator.

14. The data receiver of claim 13, wherein said statistical processor finds an average value of the statistical properties computed for said interleaved blocks, and selects, as said subset of mutually similar interleaved blocks, interleaved blocks with statistical properties not differing from said average value by more than a predetermined amount.

15. The data receiver of claim 13, wherein said statistical properties comprise a data dispersion property.

16. The data receiver of claim 15, wherein said data dispersion property is a variance.

17. The data receiver of claim 13, also comprising:

a multiplier for multiplying the sums output by said data accumulator by a factor inversely proportional to the number of interleaved blocks in said subset.

18. The data receiver of claim 17, wherein said statistical properties comprise a dispersion statistic.

19. The data receiver of claim 18, wherein said data dispersion property is a variance.

* * * * *